US006229897B1

(12) United States Patent
Holthaus et al.

(10) Patent No.: US 6,229,897 B1
(45) Date of Patent: May 8, 2001

(54) APPARATUS AND METHOD OF SECURED ANALOG VOICE COMMUNICATION

(75) Inventors: James R. Holthaus, Omaha; Max Aaron Caldwell, Lincoln, both of NE (US)

(73) Assignee: Transcrypt International, Inc., Lincoln, NE (US)

( * ) Notice: Subject to any disclaimer, the term of this patent is extended or adjusted under 35 U.S.C. 154(b) by 0 days.

(21) Appl. No.: 08/960,677

(22) Filed: Oct. 30, 1997

(51) Int. Cl.[7] ........................................ H04L 9/00

(52) U.S. Cl. ........................ 380/270; 380/31; 380/38; 380/42; 713/200; 455/410; 455/411

(58) Field of Search ........................ 380/206–208, 380/210, 236, 238, 268; 713/176

(56) References Cited

U.S. PATENT DOCUMENTS 4,318,125 * 3/1982 Shutterly ............................ 358/121
4,659,875 * 4/1987 Taurin ............................ 380/19
4,905,278 * 2/1990 Parker ............................ 380/7
4,908,860 * 3/1990 Caprarese ............................ 380/19
5,058,159 * 10/1991 Quan ............................ 380/9
5,159,631 * 10/1992 Quan ............................ 380/19
5,598,471 * 1/1997 Rademeyer ............................ 380/9

* cited by examiner

*Primary Examiner*—Tod Swann
*Assistant Examiner*—Paul E. Callahan
(74) *Attorney, Agent, or Firm*—Zarley, McKee, Thomte, Voorhees & Sease

(57) ABSTRACT

An apparatus and method for improved security in wire or wireless communication systems includes scrambling the audio signal, combining a masking signal with the scrambled audio signal, and then transmitting the scrambled masked signal. To recover the original audio, a receiver must by synchronized and know the characteristics of the masking signal and the scrambling technique. Such a receiver removes the masking signal, descrambles the audio and thus recovers the original audio. Any attempted interception of the communication would hear white noise, and even if the white noise mask where removed, the communication would still have the security level of the scrambling. The mask removes any remnants of the original audio that might be used to try to locate and intercept the communication.

34 Claims, 2 Drawing Sheets

APPARATUS AND METHOD OF SECURED ANALOG VOICE COMMUNICATION

BACKGROUND OF THE INVENTION

1. Field of the Invention

The invention relates to the securing of voice transmissions, and in particular, to an apparatus and method to improve the security of analog voice communications.

2. Problems in the Art

The present proliferation of portable communications devices has resulted in a corresponding need for security relative to those communications. Portability many times means reliance on wireless transmission, at least for a portion of the communications path. Examples are two-way radios and cellular phones. Wireless transmission, usually in free space, carries with it the problem that the communication is subject to interception. If an eavesdropper has the appropriate equipment, location and/or knowledge, the eavesdropper could relatively easily intercept the communication in as intelligible form as can the intended recipient. For example, if the interloper knew the frequency, was within transmission range, and had receiving equipment compatible with the transmitter and transmission method, the communication could be intercepted. Presently, most analog voice transmission systems are standardized and scanners allow relatively easy searching for frequencies of operating channels.

One attempted solution to this problem is to scramble the audio portion of the transmission. Manipulation of the analog representation of the voice can create an analog signal that is unintelligible to a casual eavesdropper. The transmitter and receiver, however, must both know and be synchronized to the method of manipulating the signal so that the receiver can unscramble the scrambled audio from the transmitter. Therefore, synchronization information or data must be transmitted to a receiver along with the scrambled audio (voice) that contains the voice communication intended for authorized recipients.

Examples of this type of analog scrambling are many and well-known in the art. Rolling code inversion scrambling and spectral rotation are two such examples. Examples of spectral rotation can be found in co-pending, co-owned U.S. Ser. No. 08/673,348, to inventors Burdge and Poulsen, filed Jun. 28, 1996, and co-pending, co-owned U.S. Ser. No. 08/691,600, to inventor Heermann, filed Aug. 2, 1996, respectively, both of which are incorporated by reference herein.

While scrambling of audio prevents the eavesdropper from immediately understanding the content of a voice communication, it does not necessarily mask the interception of the signal bearing the communication nor the recognition that the signal is a voice communication. If, by design or by chance, someone locked on to the frequency of transmission and listened to the signal, even scrambled certain information reveals that the signal is communicating voice or speech. For example, though unintelligible with respect to content, the received signal would reveal syllabic information. In other words, the listener would hear essentially noise, but the noise would have cadence and duration the same as speech, and would be separated by spaces (e.g. between syllables) or periods of silence, just as in speech. Therefore, at least to those of some experience in the art, most analog scrambling techniques would reveal to an interloper enough information that they could with a certain level of assurance accurately predict the probability that the signal was carrying a voice communication.

Those with enough sophistication, knowing this, could try different techniques to break the scrambling method. Thus, if trying to intercept a certain voice communication, the mere fact that an intercepted signal is probably voice is a head start. Such a priori knowledge can be important to finding and breaking the scrambled audio.

An analogy can be made with facsimile transmissions. Even though listening to the audio transmission of fax reveals no information about the content of the fax, the fax tone that is sent with each fax transmission reveals it to be a fax transmission. The interloper would have this headstart on recovering the content of the fax transmission.

There have been attempts at what will be called "masking" analog audio transmissions. An example can be seen at U.S. Pat. No. 5,101,432, incorporated by reference herein, which teaches a method for securing communications by using a Finite Impulse Response (FIR) filter with random taps. This technique tends to reduce the processed signal to a white-noise-like signal, thus masking the intended content. The intended signal is recovered at the end of the communication channel by using the inverse of the FIR filter. Thus, one trying to eavesdrop on communications would hear white noise, which would not have any information to suggest it is a voice communication. However, because this filter is by definition linear, no significant security is achieved because there is substantial prior art for recovering signals in noise. Therefore, while the masking technique, at least superficially, seems to hold promise for voice security, it in fact does not provide a substantial level of security.

A further example of masking is disclosed in U.S. Pat. No. 5,008,937 to Yamamura et al. Like U.S. Pat. No. 5,101,432 discussed above, it discloses a type of masking. It uses a generated pseudo random number (PN) sequence to create the appearance of white noise. However, if the PN sequence used to generate the "scrambling noise" becomes known, it is straightforward to break the code and recover the voice content. Thus, there is a need in the art for an improvement to analog scrambling where a higher level of security can be achieved.

It is therefore a primary object of the present invention to provide an apparatus and method for secured analog wireless voice transmission which improves over and solves the problems and deficiencies in the art.

Further objects, features, and advantages of the present invention include an apparatus and method as above-described which:

1) provide substantial, non-linear security for wireless analog communications.
2) provide enhanced security over current scrambling and masking techniques.
3) are non-complex.
4) are economical.
5) are durable.
6) take away certain a priori information that can provide an eavesdropper a head start towards identifying and then descrambling or decrypting a voice communication.

These and other objects, features and advantages of the present invention will become more apparent with reference to the accompanying specification and claims.

SUMMARY OF THE INVENTION

The present invention relates to an apparatus and method for providing security for analog audio communications, including but not limited to voice communications over radio or landline and/or cellular telephony systems. The method includes scrambling the audio by a known technique. A masking signal is generated and linearly combined with the scrambled audio. When transmitted, the channel would appear to be noise. Even one that could remove the masking signal would be faced with scrambled audio. Thus, all a priori information about what type of signal is being transmitted is masked, and also the content of the signal is scrambled, resulting in a higher level of security for the communication.

The apparatus according to the invention includes a transmitter with an analog audio scrambler module. A masking signal generator is also included with a combiner component to linearly combine the output of the scrambler and the masking signal generator. A receiver would include a component to remove the masking signal and a descrambler module.

DETAILED DESCRIPTION OF PREFERRED EMBODIMENTS

Overview

Figure 1:
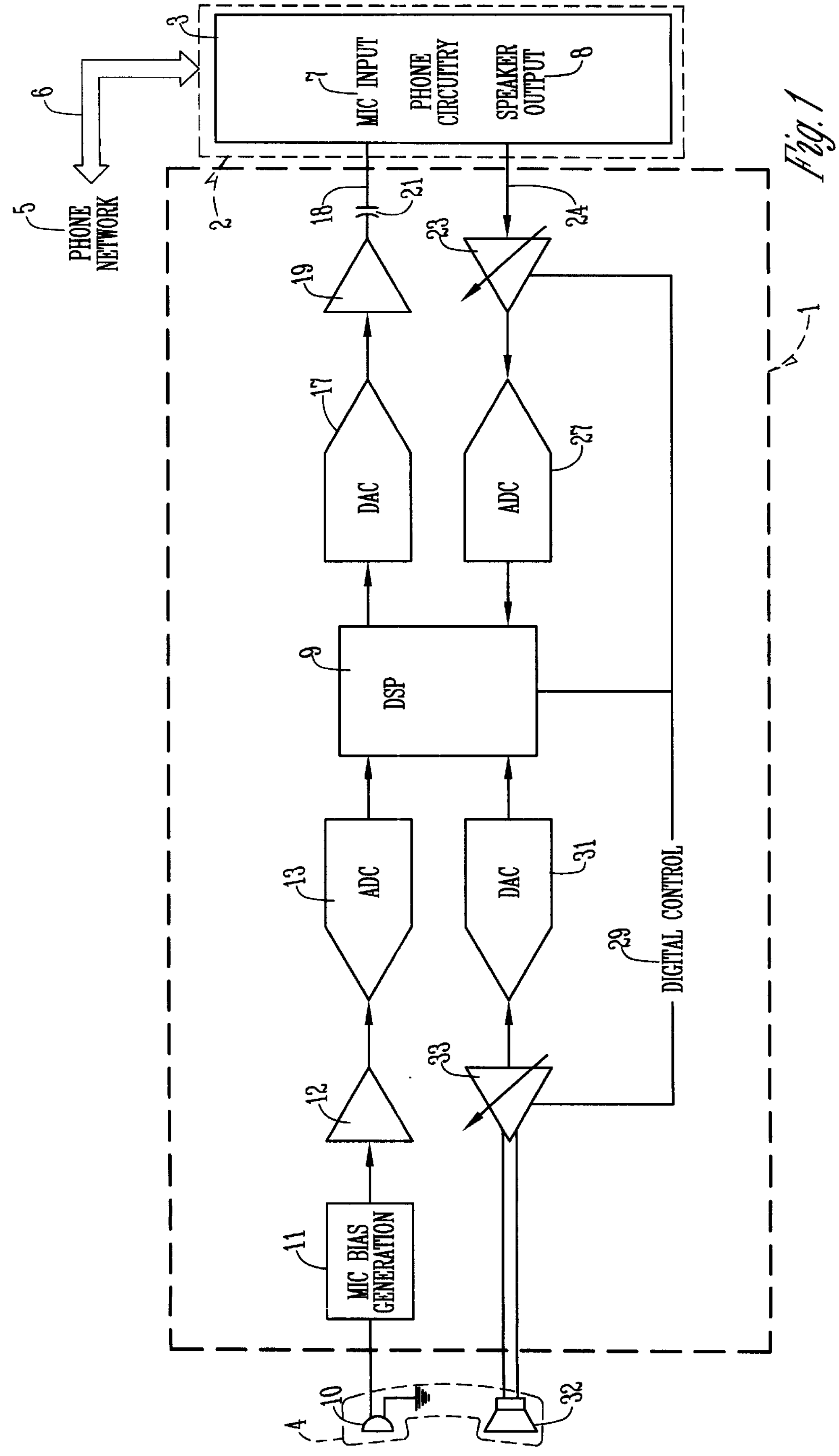
FIG. 1 is a block diagram of hardware to a preferred embodiment of the present invention operatively connected between the phone circuitry of a full duplex conventional telephone, and the microphone and speaker of the telephone.

To assist in a better understanding of the invention, a description of one embodiment or form the invention can take will now be set forth in detail. Frequent reference will be taken to the drawings. Reference numbers will sometimes be utilized to indicate certain parts or locations in the drawings. The same reference numbers will be used to indicate the same parts and locations throughout the drawings unless otherwise indicated.

This description will be in the context of two-way full duplexed voice communications between two radio transceivers or two landline or cellular telephones in conventional communications systems. Other applications are possible.

Structure of Preferred Embodiment

FIG. 1 illustrates a circuit 1 connected between a conventional telephone base 2 (which contains a conventional full duplex phone circuitry 3) and a conventional telephone handset 4 (which includes a microphone 10 and a speaker 32). Phone circuitry 3 communicates with a phone network 5 by land line and/or cellular radio communication link 6. Additional discussion of a circuit of the type of FIG. 1 can be found at co-owned, co-pending U.S. application Ser. No. 08/826,083, filed Mar. 24, 1997, which is incorporated by reference herein.

Without circuit 1, a user communicates voice or speech to another party by talking into microphone 10, which converts the acoustic energy into a analog waveform that would be sent to mic input 7 of phone circuitry 3, which in turn would convert the analog waveform into a form that can be transmitted over link 6 to network 5, and ultimately to an intended recipient.

Similarly, if an intended recipient, network 5 would deliver a communication to phone circuitry 3 which would extract the audio analog waveform and pass the same to speaker output 8. Speaker 32 would convert the analog waveform into acoustic energy at the listener's ear.

Thus, whether communicated via a telephone land line or a cellular phone or radio broadcast, the analog waveform is transferred in some form. This is all well-known in the art.

Circuit 1 is installed, as shown in FIG. 1, by placement between mic input 7 and speaker output 8, on the one hand, and mic 10 and speaker 32 on the other; i.e. between the hand set and the base of the telephone.

In circuit 1, essentially two communications pathways exist. One is between mic 10 and mic input 7. The other is between speaker output 8 and speaker 32. A digital signal processor (DSP) 9 is shared by both paths. As discussed below, most of the security functions are accomplished digitally in DSP 9. Therefore, analog to digital convertors (ADC's) 13 and 27, and digital to analog convertors (DAC's) 17 and 31, convert the analog waveform containing the speech to digital signals prior to entering DSP 9 and convert the digital signals back to analog after leaving DSP 9.

Circuit 1 receives an audio analog waveform from mic 10, adds mic bias current at 11 and amplifies the analog signal at 12. ADC 13 converts the analog signal to digital and DSP 9 scrambles the audio content, generates a masking signal, and combines the two. The result is output and converted from digital to audio at 17, amplified at 19, sent through capacitor 21, and sent as an analog signal 18 to mic input 7.

Circuit 1 receives analog signal 24 containing a communication received via network 5, and amplifies it through variable amp 23. The analog signal is converted to digital at ADC 27. DSP 9 processes the signal. If needed, DSP 9 removes away the masking signal and unscrambles any scrambled audio. The unscrambled digital audio is changed to analog at DAC 31, its gain is adjusted by variable amp 33, and the resulting signal sent to speaker 32, where intelligible speech can be heard by a listener. A digital control line 29 controls the gain of amps 23 and 33 via instruction from DSP 9.

Each of the components are conventional and well-known in the art. Those skilled in the art are readily able to select the specifications for the components and operatively connect them. The four connection points between handset 4 and phone base 2 are easily accomplished by those of ordinary skill in the art.

DSP 9 is programmed by conventional methods to perform the scrambling function, generate a masking signal, and combine the two. The software is discussed in more detail below.

Figure 2:
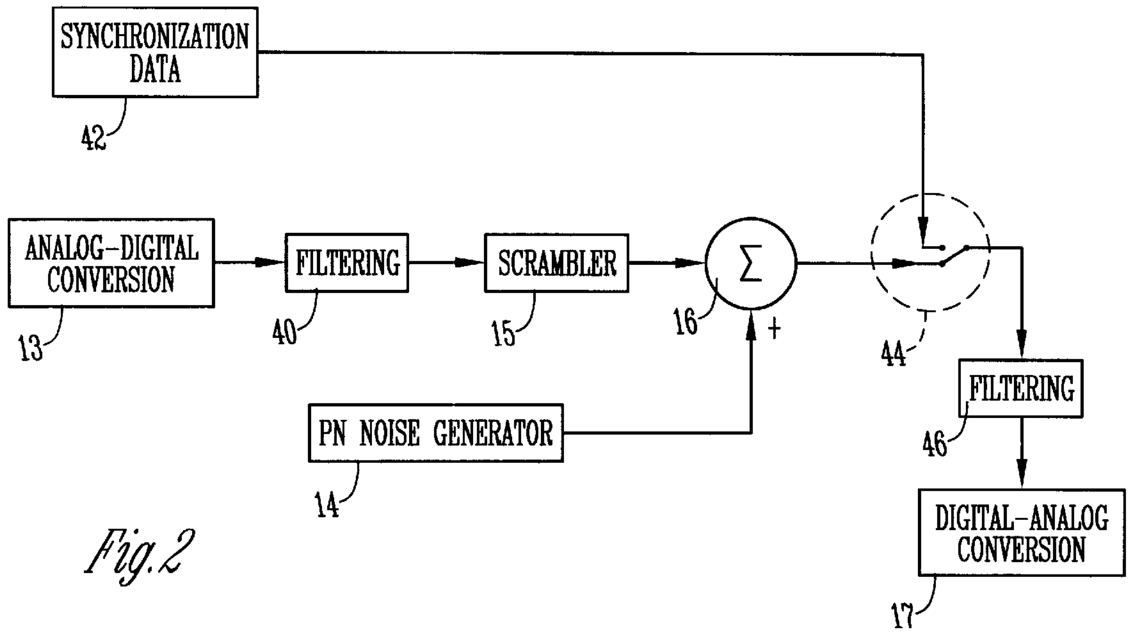
FIG. 2 is software block diagram of transmit path processing for the hardware of FIG. 1 according to a preferred embodiment of the present invention.
Figure 3:
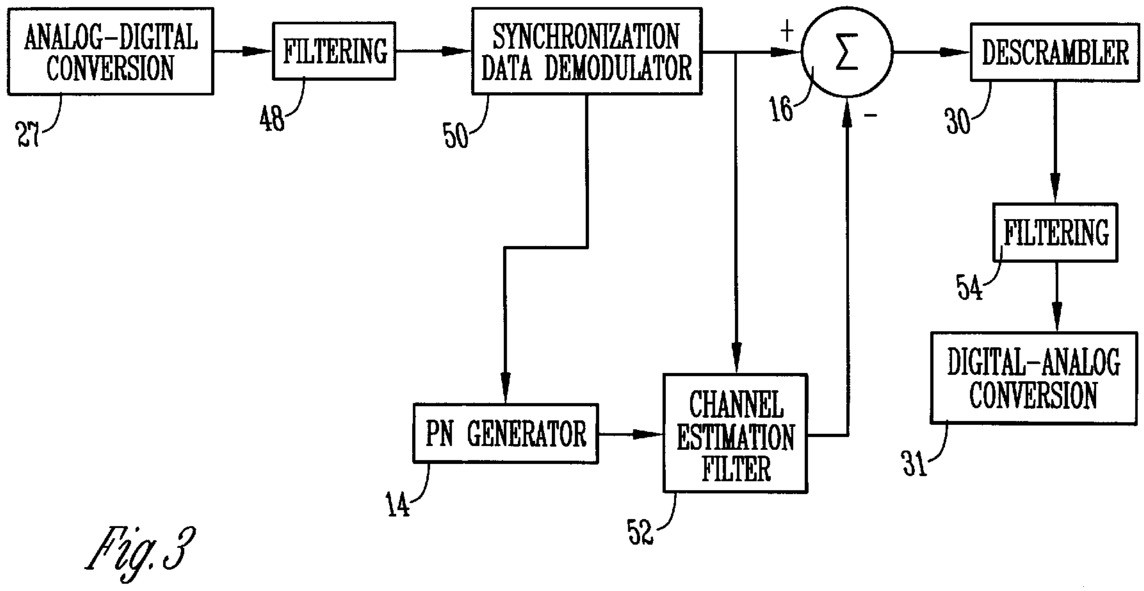
FIG. 3 is a software block diagram of receiver path processing for the hardware of FIG. 1, according to a preferred embodiment of the present invention.

FIGS. 2 and 3 functionally illustrate the operation of software programmed into DSP 9 regarding transmission of and receipt of communications, respectively, through circuit 1.

For transmission, refer to FIG. 2. Analog audio is converted to digital in ADC 13 by methods well known in the art. The resultant digital signal is filtered at 40. The filtered digital signal is then scrambled (at 15).

FIG. 2 portrays in block diagrammatic form the scrambler function (designated generally at 15). An example of such a scrambler is disclosed in U.S. Ser. No. 08/673,348, previously incorporated by reference herein. This digital representation of the original analog waveform is spectrally rotated, which manipulates the signal according to the disclosure of Ser. No. 08/673,348. The resulting output is a digital representation of the audio, but spectrally rotated according to the process of Ser. No. 08/673,348.

A masking signal generator (here pseudo random number generator (PSNG) 14) creates a stream of pseudo randomly generated digital bits which, if converted to analog and played audibly, would essentially sound like white noise. There are many methods of creating such an pseudo random number (PN) sequence. One is disclosed in U.S. Pat. No. 5,008,937 to Yamamura, incorporated by reference herein. Other examples of PN generators can be found at Press, W., et al., *Numerical Recipes in C,* Cambridge University Press (2nd Ed.), pp. 274–329, which is incorporated by reference herein.

An example masking generator is mathematically described below:

$$u(n+1)=171u(n)+11213-53125*\text{floor}[(171u(n)+11213)/53125],$$

where floor (x)=largest integer less than or equal to x and u(0)=3147.

The results of scrambler 15 and generator 14 are then combined in linear combiner 16. In the preferred embodiment, most functions are digitally implemented. Therefore, for example, linear combiner 16 can simply be the Multiply-Accumulate (MAC) of any common Digital Signal Processor (DSP). Examples of such a DSP are a Texas Instruments TM 320C5X or TMS 320F2XX family processor, a Lucent Technologies DSP16 family processor, or an Analog Devices ADSP-2100 family processor. The resulting digital bit stream is the scrambled audio modified by the pseudo-randomly generated bit stream, which essentially masks the scrambled audio. The result of combiner 16 is sent through digital-to-analog converter (DAC) 17 to convert the digital scrambled audio to an analog signal that is taken by whatever transmitter is used and then transmitted to a receiving device or devices.

As is well known in the art, synchronization data must be transmitted with the transmission to enable a receiving device to unscramble and unmask the content of the transmission. DSP 9 therefore creates such synchronization data at 42 (FIG. 2), and at desired times, inserts such data into the transmission. One way, shown in FIG. 2, is to simply switch (see reference numeral 44) the data into the digital sequence. The combined scrambled audio and masking signal, with intermittent sync data, is then filtered at 46 and converted to analog at 17. A scrambled/masked audio analog signal, with sync information, is then ready for transmission over the communications network.

The transmitted signal thus would be on a certain frequency channel. However, anyone intentionally or unintentionally locking onto the channel would hear the equivalent of white noise. There would not be the characteristic syllabic vestiges of a purely spectrally rotated scrambled speech signal. Moreover, even if the masking signal were to be removed, the scrambling would provide a substantial level of security against someone obtaining the content of the speech.

FIG. 3 diagrammatically shows receiver path processing. The scrambled and masked communication created by FIG. 2 would be received by a receiving device (e.g. see FIG. 1). This analog signal is converted at 27 to digital and filtered at 48.

The sync data in the transmitted signal is extracted (sync data demodulator 50) and used to create an identical PN stream at 14 of FIG. 3. Optionally, a channel estimation filter 52 can be used to compensate for effects the communications channel might interject into the transmitted communication (e.g. delay, fading, noise) and which may effect the PN bit stream.

The synchronized PN bit stream is subtracted from the signal (at 16 in FIG. 3) to remove the mask. The resulting signal is a digital representation of the spectrally rotated audio, i.e. the scrambled audio in digital form. Descrambling is accomplished (at 30). After filtering (at 54) the unmasked, descrambled digital audio is converted to analog at 31. It is then passed to speaker 32 where the listener can hear and understand analog audio, as converted into acoustic energy. Descrambler 30 is coordinated with spectral rotation scrambling 15 so that the receiver can reconstruct a digital representation of the original audio, i.e. descramble the audio.

As is explained in Ser. No. 08/673,348, descrambling 30 utilizes the same algorithm and is synchronized with scrambling spectral rotation 15, so that each knows how each piece of the signal is manipulated when scrambled so that the descrambler can reconstruct the original audio.

The above description sets forth the basic operation of a device incorporating the preferred embodiment of the invention. The digital functions of the embodiment could be implemented in a digital signal processor (DSP) with appropriate software. The transmitter and receiver sections would normally co-exist in a single transceiver. If two way radios, it is possible for multiple users of the radio network to be able to transmit and receive scrambled and masked communications.

Options and Alternatives

It will be appreciated that the present invention can take many forms and embodiments. The true essence and spirit of this invention are defined in the appended claims, and it is not intended that the embodiment of the invention presented herein should limit the scope thereof.

For example, the addition of the masking function could be implemented as a software update in the Transcrypt International SC20-500 two-way simplex scramblers. Existing SC20-500 devices could be returned to the factory where the software could be updated. The existing DSP and other components, such as A/D and D/A converters, RF transmitter and receiver, antenna, and the like can be used. It could also be implemented in hardware though.

Different types of such scramblers are commercially available and the methodology is well known in the art. One such inversion scrambler is available from the owner of this application under the trademark Crypto Voice Plus (CVP). A proprietary method of inversion scrambling is disclosed at U.S. Ser. No. 08/673,348 filed Jun. 28, 1996, which is owned by the owner of the present application, and is incorporated by reference herein.

The preferred embodiment sums or adds the scrambled audio and masking signal. It is to be understood that other types of combinations are possible. It is preferred that the combinations be linear, however, because although nonlinear combinations may work, they work on channels with no interference or fading. If the channel is not essentially interference or fade free, they will probably not work very well.

The invention can be implemented in full duplex systems or in simplex systems, such as is within the skill of those skilled in the art from this description.

The embodiment is also described in the context of an after-market, up-grade product. The invention can also be incorporated as an originally manufactured part of the communications devices and could be used with cellular phones or other communications devices over and above radios.

The masking signal generator could vary from application to application. One example is to use a shift register to generator the “white noise” bit stream. The shift register would, of course, have to be synchronized between the transmitter and receiver.

Furthermore, a channel estimation filter could be used with the invention to compensate for channel effects. There are several methods for this well known in the art process. Yamamura U.S. Pat. No. 5,008,937 discloses one such method which uses an Adaptive Transversal Filter to remove the effects of the communication channel on the PN sequence, thus reducing any error when subtracting. Telephony modems use a similar method in which a PN sequence is transmitted over the communication channel, and then an ATF equalizes the receiver for the channel response. In this proposed system, the sync data has a known fixed pattern, and is transmitted at a fixed interval (nominally 0.5 sec.) This fixed pattern can be used to provide the estimate of the channel response, as well as updating the channel estimation filter at 0.5 sec. intervals.

What is claimed:

1. An improved voice security communications system comprising:

a plurality of transceivers each having a transmitter section and a receiver section;

each transmitter section including a voice scrambler and a masking signal generator;

each transmitter section including a linear combiner having inputs connected to the outputs of the voice scrambler and the masking signal generator, and an output that carries a linearly combined scrambled and masked voice signal;

each receiver section including a separator component which is synchronized to the masking signal generator, a descrambler that is synchronized to the voice scrambler, and a channel estimation filter;

so that any transmitted signal on the network by a said transceiver is both scrambled and masked and any signal received by a said transceiver on the network can remove the masking signal and recover the original voice.

2. The system of claim 1 wherein the communication system is an RF communication system.

3. The system of claim 2 wherein the RF communication system is a two-way duplex radio communication system.

4. The system of claim 1 wherein the communication system is a land line and/or cellular telephone communication system.

5. The system of claim 1 wherein the voice scrambler comprises a component for manipulating frequency spectra of at least portions of the audio.

6. The system of claim 5 wherein the voice scrambler comprises a component for spectral rotation scrambling.

7. The system of claim 6 wherein the spectral rotation scrambling comprises rolling code spectral inversion scrambling.

8. The system of claim 1 wherein the masking signal is a pseudo random number sequence.

9. The system of claim 1 the transmitter section further comprising components for converting the analog voice signal into a digital signal representative of the analog voice signal, creating the masking signal out of a digital bit stream, and linearly combining the digital signal representation of the analog voice signal and the digital masking signal.

10. The system of claim 9 wherein said masking signal is created by a pseudo random number generator.

11. The system of claim 1 the receiver section further comprising a component for receiving the combined signal, removing the masking signal, and descrambling the digitized analog voice signal.

12. The system of claim 1 wherein the audio signal is scrambled according to a frequency spectrum rotation technique.

13. The system of claim 1 wherein the masking signal is created by generating a signal of pseudo random characteristics.

14. The system of claim 13 the receiver section further comprising a component for receiving the transmitted signal, separating the masking signal from the scrambled signal, and descrambling the scrambled signal.

15. The system of claim 1 wherein the step of linear combining comprises adding.

16. The system of claim 1 wherein the transmitter section and the receiver section both include an A/D converter and a D/A converter.

17. The system of claim 1 wherein the masking signal generator includes a pseudo random number bit stream generator.

18. The system of claim 1 wherein the masking results in a signal to noise of approximately 0 dB.

19. The system of claim 1 wherein the masking results in white noise.

20. The system of claim 1 wherein the voice scrambler, masking signal, separator and descrambler are implemented in a digital signal processor with software.

21. The system of claim 1 wherein the voice scrambler and scrambler utilize spectral rotation as a scrambling and descrambling technique.

22. The system of claim 1 wherein the masking signal and separator utilize pseudo random number generated bit streams as the masking signal.

23. The system of claim 1 wherein linear combiner is accomplished by a linear combination function in the digital signal processor.

24. An improved voice security communications system comprising:

a plurality of transceivers each having a transmitter section and a receiver section;

each transmitter section including a voice scrambler and a masking signal generator;

each transmitter section including a linear combiner having inputs connected to the outputs of the voice scrambler and the masking signal generator, and an output that carries a linearly combined scrambled and masked voice signal sufficient to mask the content of the analog audio signal;

each receiver section including a separator component which is synchronized to the masking signal generator and a descrambler that is synchronized to the voice scrambler, and a channel estimation filter;

so that any transmitted signal on the network by a said transceiver is both scrambled and masked and any signal received by a said transceiver on the network can remove the masking signal and recover the original voice.

25. The system of claim 24 wherein the masking results in a signal to noise of approximately 0 dB.

26. The system of claim 24 wherein the masking results in white noise.

27. The system of claim 24 wherein the communication system is an RF communication system.

28. The system of claim 27 wherein the RF communication system is a two-way duplex radio communication system.

29. The system of claim 24 wherein the communication system is a land line and/or cellular telephone communication system.

30. The system of claim 24 wherein the voice scrambler comprises a component for manipulating frequency spectra of at least portions of the audio.

31. The system of claim 24 wherein the voice scrambler, masking signal, separator and descrambler are implemented in a digital signal processor with software.

32. The system of claim 31 wherein the voice scrambler and scrambler utilize spectral rotation as a scrambling and descrambling technique.

33. The system of claim 31 wherein the masking signal and separator utilize pseudo random number generated bit streams as the masking signal.

34. The system of claim 31 wherein linear combiner is accomplished by a linear combination function in the digital signal processor.

* * * * *